(Model.)

J. & R. BEAN.
Wheelbarrow Wheel.

No. 237,235. Patented Feb. 1, 1881.

Witnesses.
Franck L. Durand
H. Aubrey Toulmin

Inventor.
John Bean
Roscoe Bean
By Alexander Mason
atty

UNITED STATES PATENT OFFICE.

JOHN BEAN AND ROSCOE BEAN, OF SPRINGFIELD, OHIO.

WHEELBARROW-WHEEL.

SPECIFICATION forming part of Letters Patent No. 237,235, dated February 1, 1881.

Application filed December 21, 1880. (Model.)

*To all whom it may concern:*

Be it known that we, JOHN BEAN and ROSCOE BEAN, of Springfield, in the county of Clarke, and in the State of Ohio, have invented certain new and useful Improvements in Wheelbarrow-Wheels; and we do hereby declare that the following is a full, clear, and exact description thereof, reference being had to the accompanying drawings, and to the letters of reference marked thereon, making a part of this specification.

This invention relates to certain improvements in wheelbarrow-wheels; and it has for its objects to produce a wheel which shall be cheap, light, and durable, and which, when the parts are properly secured together, will form virtually a solid wheel, with the shaft attached complete, and which can be readily taken to pieces and new parts substituted for any that may become worn or injured, as more fully hereinafter specified. These objects we attain by the devices represented in the accompanying drawings, in which—

Figure 1:
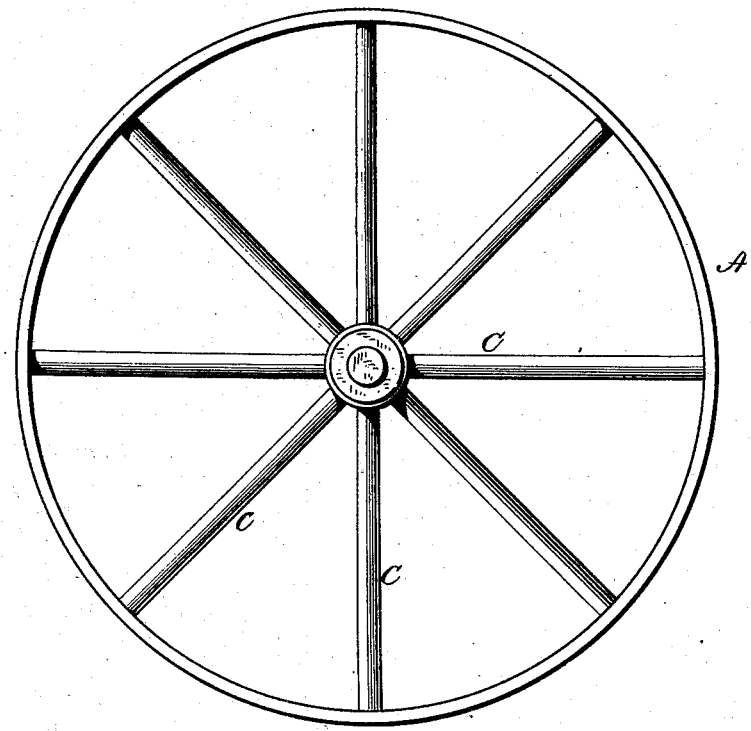
Figure 2:
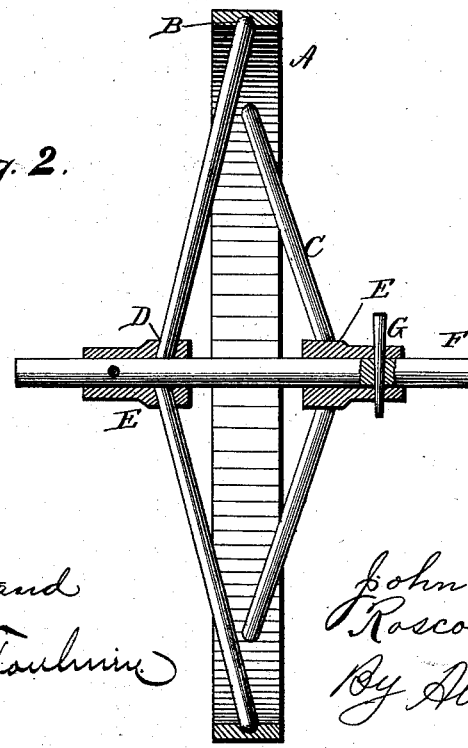

Figure 1 represents a side elevation of a wheel constructed according to our invention, and Fig. 2 a vertical sectional view of the wheel.

The letter A indicates the felly of the wheel, which is constructed of metal, preferably of wrought-iron. On the inside of said felly, at equidistant points, are formed a series of recesses, B, for the reception of the outer ends of the spokes C. The said spokes consist of metallic rods, the inner ends of said wires being alternately secured in recesses D in the hubs E, which are mounted on the shaft F, and are secured thereto by means of the pins G. The hubs are located on the shaft at opposite sides of the wheel in such position that the spokes incline inwardly toward the felly from their respective hubs, thus forming a securely-braced wheel.

The shaft or axle, it will be observed, projects beyond the respective hubs at the ends, forming the journals for the wheel.

Having thus described our invention, what we claim, and desire to secure by Letters Patent, is—

A wheel composed of a metallic felly provided with suitable recesses on the inside, the spokes fitted at their outer ends in said recesses, the hubs on opposite sides of the wheel secured to a suitable shaft, the ends of which project from the hubs, forming journals for the wheels, substantially as specified.

In testimony that we claim the foregoing we have hereunto set our hands this 6th day of December, 1880.

JOHN BEAN.
ROSCOE BEAN.

Witnesses:
WM. R. HORNER,
M. T. BURNHAM.